United States Patent [19]

Tournut

[11] 4,368,217
[45] Jan. 11, 1983

[54] PROCESS FOR PROVIDING A POLYTETRAFLUOROETHYLENE COATING ON THE WALLS OF A METAL BODY

[75] Inventor: Claude Tournut, Francheville, France

[73] Assignee: Produits Chimiques Ugine Kuhlmann, Courbevoie, France

[21] Appl. No.: 265,788

[22] Filed: May 21, 1981

[30] Foreign Application Priority Data

Jun. 6, 1980 [FR] France ............................... 80 12576

[51] Int. Cl.³ .................... B05D 7/22; B05D 3/02; B05D 3/12; B05D 7/24
[52] U.S. Cl. ................................ 427/181; 264/512; 427/238; 427/239
[58] Field of Search .............. 264/512; 427/181, 238, 427/239

[56] References Cited

U.S. PATENT DOCUMENTS 2,724,672  11/1955  Rubin .

Primary Examiner—James R. Hoffman
Attorney, Agent, or Firm—Sigalos & Levine

[57] ABSTRACT

The invention relates to a process for providing an adherent coating of polytetrafluoroethylene (PTFE) on the inner walls of a hollow metal body wherein a flexible membrane is used to form a space between the inner walls of the hollow metal body and the inner walls of a flexible membrane, filling the space with PTFE, compressing the PTFE by deformation of the membrane under isostatic pressure, removing the membrane, filling the inner cavities of the hollow metal body with a substantially incompressible solid substance having fluid flow characteristics and being thermally stable at the temperatures to which the PTFE is to be heated, heating the thus-formed assembly to a temperature above the melting point of the polytetrafluoroethylene for a period of time sufficient for the latter to lose its crystallinity.

5 Claims, 1 Drawing Figure

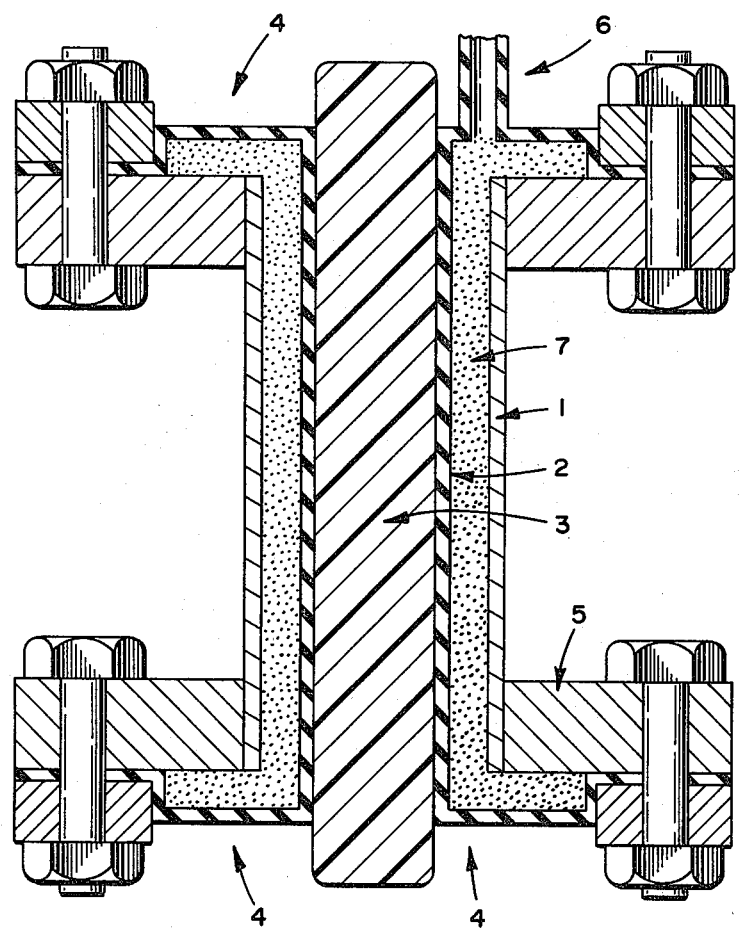

PROCESS FOR PROVIDING A POLYTETRAFLUOROETHYLENE COATING ON THE WALLS OF A METAL BODY

BACKGROUND OF THE INVENTION

This invention relates to a process of providing an adherent coating of polytetrafluoroethylene (PTFE) on the walls of a metal body, particularly the inner walls of a hollow metal body. The PTFE coating obtained enables the metal parts to resist corrosion and has excellent powers of adhesion to metal walls under vacuum, even at elevated temperatures.

PTFE is known for its resistance to chemical reagents, even at elevated temperatures, which makes it useful as a protective coating for metallic materials, such as pipes, valve bodies, containers, and the like, which come into contact with corrosive products. In these applications, the PTFE, used as a relatively thin coating, provides chemical resistance, while the mechanical strength is provided by the metallic material.

Starting with aqueous dispersions of PTFE or organosols it is possible to apply coatings to the inner walls of a hollow metal body by spraying. Spraying is usually followed by drying and heating. With a process of this kind, it is only possible to obtain thin, more or less porous coatings which cannot give the metal support effective long-term protection against corrosion by every chemical reagent.

To provide better protection, casings of PTFE are generally used, which are obtained previously be using conventional techniques such as extrusion or rolling in a strip, for example. These casings are inserted, under some pressure, as described in French Pat. No. 1,198,620, into the hollow metal body, which is thus protected against corrosion.

This technique has a major drawback, which is the poor behavior in a vacuum, or even at slight underpressure, of the PTFE casing, owing to the fact that it does not adhere to the metal walls.

SUMMARY OF THE INVENTION

With the process according to the present invention, a coating is obtained which has excellent adhesion to the inner walls of a hollow metal body. Thus, it can be used, for example, in the production of all the elements of an apparatus which carries corrosive fluids, possibly under reduced pressure and at elevated temperature, such as pipe elements, valve bodies, and containers.

The process comprises first filling with PTFE the space formed between the inner walls of the hollow metal body and the walls of a flexible membrane spaced apart therefrom, compressing the PTFE by deformation of the membrane under isostatic pressure, removing the membrane, filling the internal cavities of the metal body with a substantially incompressible solid substance having fluid flow characteristics and which is stable at the temperatures to which the PTFE is to be heated, and heating the thus-formed assembly to a temperature above the melting point of the PTFE for a period of time such that the PTFE loses its crystallinity.

BRIEF DESCRIPTION OF THE DRAWING

The single FIGURE of the drawing is a sectional view of a steel sleeve being coated in accordance with the present invention.

DETAILED DESCRIPTION

In carrying out the instant process the first step is to provide a confined space about the surface, wall or walls, of the metal body to be coated with the PTFE. The space is defined by the surface of the metal body and a flexible membrane removably attached to the metal body.

The free space between the inner walls of the hollow metal body and the walls of the flexible membrane depends on the cross section of the membrane. This section, which is lower than that of the hollow metal body and preferably of the same shape as the metal body, is freely chosen by the man skilled in the art, depending on the thickness of the final coating of PTFE which he wishes to obtain. The membrane is held in place in the hollow body by any suitable fixing means which will maintain the spacing, thereby forming a mold between the walls of the hollow body and the membrane. These fixing means are not original per se; they may consist, for example, of a mandrel supporting the membrane by its inner walls, or a collar system fixed directly to the metal body. The flexible membranes which may be used in the process are of the kind normally used in molding under isostatic pressure, the best results being obtained with membranes made of natural or synthetic rubber and the like.

The PTFE is introduced into the space forming the mold constituted by the walls of the metal body and the membrane, preferably in the form of a powder suitable for molding or granular powders. Before the whole is compressed in a water-filled enclosure at a pressure of 15 to 45 MPa, preferably 25 to 35 MPa, the PTFE is preferably compacted as the mold is filled and is degassed under vacuum.

In conventional processes for using PTFE, after compression the PTFE is sintered at a temperature above its melting point of 342° C., in practice between 365° and 390° C., for a length of time sufficient for it to lose its crystallinity. One feature of this sintering operation is the considerable expansion of the PTFE, of the order of 20% by volume, at its melting point. By contrast, metals, especially steel, expand much less than PTFE and indeed expand in a substantially linear manner between ambient temperature and 390° C. Therefore, if a PTFE coating is applied by isostatic molding onto a hollow metal body, on being sintered, the PTFE expands considerably at the moment when it melts and thus becomes detached from the metal walls. After cooling, the PTFE no longer adheres to the metal.

In order to overcome this disadvantage, the second major step of the process according to this invention provides that, after the membrane used for the isostatic compression has been removed and before sintering is carried out, the empty parts of the hollow body are carefully filled with a solid substance having fluid flow characteristics, this substance being substantially incompressible and thermally stable at up to 400° C.; i.e., being stable at temperatures above that at which the PTFE is to be sintered. Consequently, during sintering, as the PTFE reaches its melting point, it is unable to expand, but instead tends to become anchored to the rough walls of the metal body. In this way, after cooling and elimination of the substance, a PTFE coating is finally obtained which has good properties of adhesion to the walls of the metal body.

The term "solid substance having fluid flow characteristics" as used herein refers to a material having an ability to flow like a fluid such that all the hollow parts of the metal body coated with PTFE can be filled easily. These solid substances are generally found in the form of powders or beads. Examples of these substances include metal powders and shot, glass beads and oxides and mineral salts. Some mineral salts, such as sodium chloride, are of interest because of their solubility in water, which makes it possible to wash away the last traces of solids still remaining impregnated in the sintered PTFE coating of the finished article.

This solid substance should be stable at least to 400° C. so as to prevent it from decomposing before the sintering temperature of the PTFE is reached, or prevent it melting, which would result in the formation of a solid block, after cooling, which would be difficult to remove.

Finally, this solid substance should be virtually incompressible, otherwise the expansion of the PTFE cannot be prevented and the aim of the invention cannot be achieved. To limit the compressibility of the solid substance as much as possible, it is advisable to compact it carefully in the hollow metal body coated with PTFE.

The invention will be further described in the examples which follow, which are set forth for purposes of further illustration only.

EXAMPLE 1

This example, which is diagrammatically illustrated in the accompanying single drawing, relates to the internal coating of a steel tube, internal diameter 66 mm, length 300 mm, with flanges welded on at both ends.

After the parts of the tube to be coated have been sandblasted, a space is provided between steel tube 1 and rubber membrane 2 supported by a polyvinyl chloride mandrel 3 with a diameter of 50 mm. Rubber membrane 2 is designed so that it is possible to mold collars 4 onto metal flanges 5, as well as to coat tube 1.

The space thus formed constitutes a mold which is filled, through tube 6, with PTFE molding powder 7 (SOREFLON 81 G), by compacting the powder lightly with a mallet. Once filling is complete, tube 6 is used to establish a vacuum in the powder in order to eliminate the air trapped with the PTFE. After tube 6 has been closed off, mandrel 3 is removed and the whole assembly is placed in an enclosure filled with water. The pressure is progressively increased over a period of 10 minutes to 25 MPa and then maintained at this pressure for 2 minutes before decompression is carried out.

After the part has been taken out of the enclosure and the membrane has been removed, one end of the metal tube is closed off with a metal flange. The tube is filled with glass beads 0.5 mm in diameter and sealed at the other end with a metal flange. For sintering, it is placed in a ventilated oven the temperature of which is increased from 20° to 375° C. in 5 hours, then kept at this temperature for 4 hours and cooled to 20° C. in 5 hours.

Once the metal flanges and glass beads have been removed, a tube is obtained with an internal diameter of 59 mm. A thin layer of glass beads impregnated in the PTFE may still be left. In this case, light machining will eliminate them.

Visually, the metal surface is found to be perfectly coated. The part is heated to 180° C. for 15 hours, then soaked in cold water. No detachment of the PTFE coating is observed.

The tube is then closed off in leak-tight manner and put under vacuum at a temperature of 150° C. The coating continues to adhere, even after three cycles of heating and cooling under vacuum.

EXAMPLE 2

As a comparison, Example 1 is repeated, but no solid substance is put into the PTFE-coated tube before the sintering operation.

The appearance of the end product obtained is similar to that of Example 1, but the internal diameter is 52.5 mm. When a collar is cut off, a space of about 3 mm is found between the PTFE and the steel. Finally, if the tube is heated to 150° C. under vacuum, the coating of PTFE collapses immediately.

EXAMPLE 3

The conditions of Example 1 are used again on the same steel tube, on a T-piece with an internal diameter of 66 mm having three equal arms 150 mm long, and on an elbow piece bent at 90° with an internal diameter of 66 mm and with an arc length of 35 mm, but for the sintering operation the glass beads are replaced by sodium chloride in the form of fine cooking salt.

After sintering, the salt is easily removed from the tubes, and the last traces are eliminated by rinsing in hot water.

The adhesion of the coating is excellent and is maintained even after the product has been subjected to prolonged periods under vacuum at 150° C. The adhesion of the PTFE to the metal wall can only be affected using a hammer and chisel, thereby destroying the PTFE coating.

EXAMPLE 4

This example is a variant of Example 3, showing one of the ways of limiting the quantity of solid substance to be used for large-volume hollow bodies.

In a steel tube with an internal diameter of 132 mm and 500 mm long, a coating of PTFE 6 mm thick is molded by isostatic molding using the procedure described in Example 1.

After molding, a steel tube with an external diameter of 90 mm is placed inside. The annular 15 mm space between the tube and the PTFE is filled with sodium chloride and then closed off with metal flanges and placed in a ventilated oven, the temperature of which is increased to 375° C. over a period of 5 hours, then maintained at this temperature for 4 hours and reduced to ambient temperature over a period of 5 hours.

After removal of the steel tube and salt, the final internal diameter is 120 mm.

The coated tube is then subjected to the following cycles: 2 hours at 150° C., with 2 hours' temperature rise and 2 hours' lowering of temperature. After 360 hours; i.e., 60 cycles, no detachment of the coating has occurred.

Keeping the tube under vacuum at 150° C. does not result in detachment of the coating either.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A process for providing a coating of polytetrafluoroethylene on the inner walls of a hollow metal body comprising filling with polytetrafluoroethylene the space formed between the inner walls of the hollow metal body and the walls of a flexible membrane removably spaced apart therefrom, compressing the polytetrafluoroethylene by deformation of the membrane under isostatic pressure, removing the membrane, filling the internal cavities of the hollow metal body coated with the compressed polytetrafluoroethylene with a substantially incompressible solid substance having fluid flow characteristics and being thermally stable at the temperatures to which the polytetrafluoroethylene is to be heated, and heating the thus-formed assembly to a temperature above the melting point of the polytetrafluoroethylene for a period of time sufficient for the latter to lose its crystallinity.

2. The process of claim 1, wherein the polytetrafluoroethylene is compressed under a pressure of about 15 to 45 MPa.

3. The process of claims 1 or 2, wherein the solid substance is in the form of powder or beads.

4. The process of claims 1, or 2, wherein the solid substance is a water-soluble mineral salt.

5. The process of claim 1, wherein the compression is under a pressure of about 15 to 45 MPa, the solid substance is sodium chloride, and after sintering the sodium chloride is removed from the internal cavities of the hollow metal body.

* * * * *